United States Patent
Fink

(10) Patent No.: US 6,473,765 B1
(45) Date of Patent: Oct. 29, 2002

(54) MATCHING/MERGING TWO DATA WAREHOUSE PHYSICAL DATA MODELS

(75) Inventor: Ronald Fink, Huntington Valley, PA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/472,130

(22) Filed: Dec. 23, 1999

(51) Int. Cl.[7] .............................................. G06P 17/30
(52) U.S. Cl. ...................... 707/102; 707/10; 707/103 R
(58) Field of Search ............................ 707/10, 103 R, 707/102, 2; 709/332

(56) References Cited

U.S. PATENT DOCUMENTS

| | | | |
|---|---|---|---|
| 5,058,000 A | 10/1991 | Cox et al. | 707/10 |
| 5,278,978 A | 1/1994 | Demers et al. | 707/101 |
| 5,408,652 A | 4/1995 | Hayashi et al. | 707/1 |
| 5,493,671 A | 2/1996 | Pitt et al. | 707/203 |
| 5,537,590 A * | 7/1996 | Amado | 707/2 |
| 5,566,332 A | 10/1996 | Adair et al. | 707/101 |
| 5,768,577 A | 6/1998 | Kleewein et al. | 707/10 |
| 5,819,264 A | 10/1998 | Palmon et al. | 707/4 |
| 5,872,973 A * | 2/1999 | Mitchell et al. | 709/332 |
| 5,873,088 A | 2/1999 | Hayashi et al. | 707/100 |

OTHER PUBLICATIONS

"Scribe Software Corp.—Product Data Sheet", www.scribesoft.com/Products.htm, Jun. 14, 1999, pp. 1–3.
Scribe Software Corporation—Product Data Sheet, Jun. 14, 1999 http://www.scribesoft.com/Products.htm.

* cited by examiner

*Primary Examiner*—Diane D. Mizrahi
(74) *Attorney, Agent, or Firm*—Lowe Hauptman Gopstein Gilman & Berner, LLP

(57) ABSTRACT

The mechanism is directed to a method and apparatus which provides a technique and tools to allow a combination of existing customer databases to be used by transforming a portion of the data in the existing data warehouses into a second data structure. Advantageously, greater functionality can be achieved by using new application programs while existing application programs can continue to be used without changes to code of the existing applications.

20 Claims, 4 Drawing Sheets

MATCHING/MERGING TWO DATA WAREHOUSE PHYSICAL DATA MODELS

FIELD OF THE INVENTION

The present invention relates generally to relational databases, and more particularly, to transforming one or more tables of an existing database using an existing application program into a different format for use with a different application program using the remaining tables of the existing database and the transformed tables which together form a new database.

BACKGROUND OF THE INVENTION

There are many existing data warehouses in use. One or more existing applications access the data in the existing data warehouse and provide useful information to a user. However, new applications have more functionality than older existing applications. The new application often requires the data in the data warehouse to be in a different or added format. Disadvantageously, there are costs in transforming the data into the different format for use by the new application. This may dissuade the user from purchasing the new application because of the difficulty in estimating the costs involved and there may be recoding required of the existing application/scripts. Thus, for both the existing and new application to function properly, there must be heterogeneous data for the existing application and in a second format for the new application.

Numerous issued patents attempt to deal with heterogeneous data as summarized below.

An application toolkit called Kitchen Sync, available from Scribe Software Corporation, allows the integration of data into multiple applications without custom programming. The toolkit allows communication with applications using external interfaces of the applications.

U.S. Pat. No. 5,819,264 discloses a method of performing a navigated associative search on a set of heterogeneous databases. The method includes first converting the databases to a schema-free structure. Once all of the databases are converted to schema-free structure, the databases are combined into a single database which is then normalized. The normalized database is then searched, and answers are displayed to a user.

U.S. Pat. No. 5,566,332 describes a method for dissimilar relational databases to be mutually understood and preserved with minimized need for data conversions. The method utilizes layers of descriptive information which isolate machine characteristics, levels of support software, and user data descriptions. Any data conversions that become necessary are done only by the receiving computer.

U.S. Pat. No. 5,493,671 describes a method and apparatus for conversion of database data into a different format on a field by field basis using a table of conversion procedures. The apparatus and method allow the sharing of data by computer systems running different versions of a given software package. The method and apparatus also provide for information stored in a first database to be translated and then stored in a second database.

U.S. Pat. No. 5,278,978 discloses a system in which data is exchanged between dissimilar relational database management systems can be mutually understood and preserved. The disclosed method utilizes layers of descriptive information which isolate machine characteristics, levels of support software, and user data descriptions.

U.S. Pat. No. 5,408,652 discloses a method and apparatus for heterogeneous database access by generating different access procedures for different database data structures. The apparatus contains a library of database types and database profiles of each database type. The apparatus queries the database to determine a database type for the database and then can access the database based on the database profile stored in the library of database types.

U.S. Pat. No. 5,768,577 discloses a method for performance optimization in a heterogeneous, distributed database environment. The method utilizes block fetch operations and positioned update operations. These operations allow a first database to be read, re-formatted, and placed into a second database.

U.S. Pat. No. 5,873,088 describes a derived database processing system enabling one program to access a plurality of databases. The system comprises a dictionary, a derived database registering unit, a dictionary information manipulating means, and a database processing procedure generating unit.

Yet, none of the previously mentioned references can reuse an existing data warehouse using older applications concurrently with new more highly functional applications.

Thus, a need still exists for a technique and a tool to allow a combination of existing customer databases having a first physical data model with segments of a second physical data model in order to allow the customer to use all the functions associated with a first data warehouse using the existing customer database while allowing new and more highly functional applications to work without change to the code of the first application.

SUMMARY OF THE INVENTION

It is, therefore, an object of the present invention to use an existing data warehouse while enabling new applications with greater functionality to execute on data stored in the existing data warehouse.

It is another object of the present invention to transform a portion of the data stored in an existing data warehouse into a second database structure for use a second application program.

It is yet a further object of the present invention to reduce the amount of storage space required to convert all of the data stored in an existing data warehouse into a second data warehouse.

It is yet another object of the present invention to establish a set of transformation classes to characterize a set of structural and labeling differences between two different physical data models.

The present invention provides a technique and tools to allow combination of existing customer databases, based upon their physical data model, with segments of a different new desired physical data model, in order to allow the customer to continue to use all functions associated with their data warehouse, including an existing applications, while enabling new and different applications to work with no change to the code of the existing application.

The present invention is directed to a method and apparatus which provides a technique and tools to allow a combination of existing customer databases to be used by transforming a portion of the data in the existing data warehouses into a second data structure. Advantageously, greater functionality can be achieved by using new application programs while existing application programs can continue to be used without changes to code of the existing applications.

These and other objects of the present invention are achieved by a method of using a first database structure and a first application program by transforming a portion of data in the first database structure into a second database structure for use by a second application program. A set of classes is established for the second database structure. A list is created which relates the set of classes between the first database structure and the second database structure. A selected portion of the data is moved and transformed from the first database structure to the second database structure such that the second application program can use the remaining untransformed data in the remaining untransformed first database structure and the transformed data in the second database structure.

The foregoing and other objects of the present invention are achieved by a method of using a first database structure and a first application program by transforming a portion of data in the first database structure into a second database structure in a second database for use by a second application program. A set of classes is established for the second database structure. A list is created which relates the set of classes between the first database structure and the second database structure. Data from a data source is moved and transformed to the second database structure such that the second application program can use the data in the first database structure and the data in the second database structure The foregoing and other objects of the present invention are achieved by a computer architecture using a first database structure and a first application program by transforming a portion of data in the first database structure into a second database structure in a second database for use by a second application program. Establishing means are provided for establishing a set of classes for the second database structure. Creating means are provided for creating a list which relates the set of classes between the first database structure and the second database structure. Moving and transforming means are provided for moving and transforming a selected portion of the data from the first database structure to the second database structure such that the second application program can use the remaining untransformed data in the first database structure and the transformed data in the second database structure.

The foregoing and other objects of the present invention are achieved by an article using a first database structure and a first application program by transforming a portion of data in the first database structure into a second database structure in a second database for use by a second application program. At least one sequence of machine executable instructions is provided on a medium bearing the executable instructions in machine form, wherein execution of the instructions by one or more processors causes the one or more processors to establish a set of classes for the second database structure, create a list which relates the set of classes between the first database structure and the second database structure, and move and transform a selected portion of the data from the first database structure to the second database structure such that the second application program can use the remaining untransformed data in the first database structure and the transformed data in the second database structure.

The foregoing and other objects of the present invention are achieved by a computer system including a processor and a memory coupled to the processor, the memory having stored therein sequences of instructions, which, when executed by said processor, causes the processor to perform the steps of establishing a set of classes for the second database structure, creating a list which relates the set of classes between the first database structure and the second database structure, and moving and transforming a selected portion of the data from the first database structure to the second database structure such that the second application program can use the remaining untransformed data in the first database structure and the transformed data in the second database structure.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for matching/merging two data warehouse physical data models dynamically are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
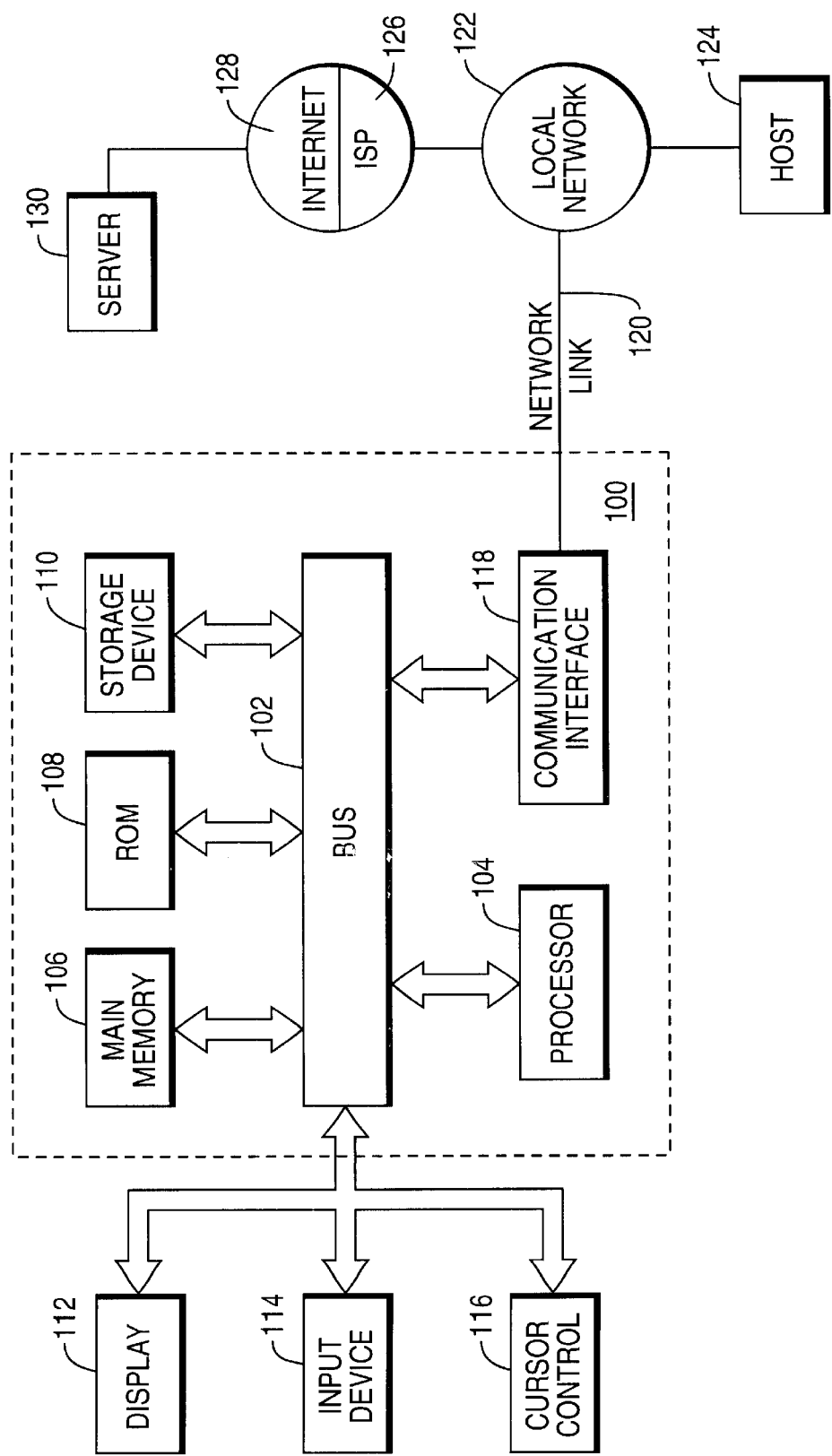
FIG. 1 is a high level block diagram of a computer architecture usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to match/merge two data warehouse physical data models (PDMs) dynamically. According to one embodiment of the invention, the matching and merging is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a her wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the transformed data to the new database. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

Figure 2:
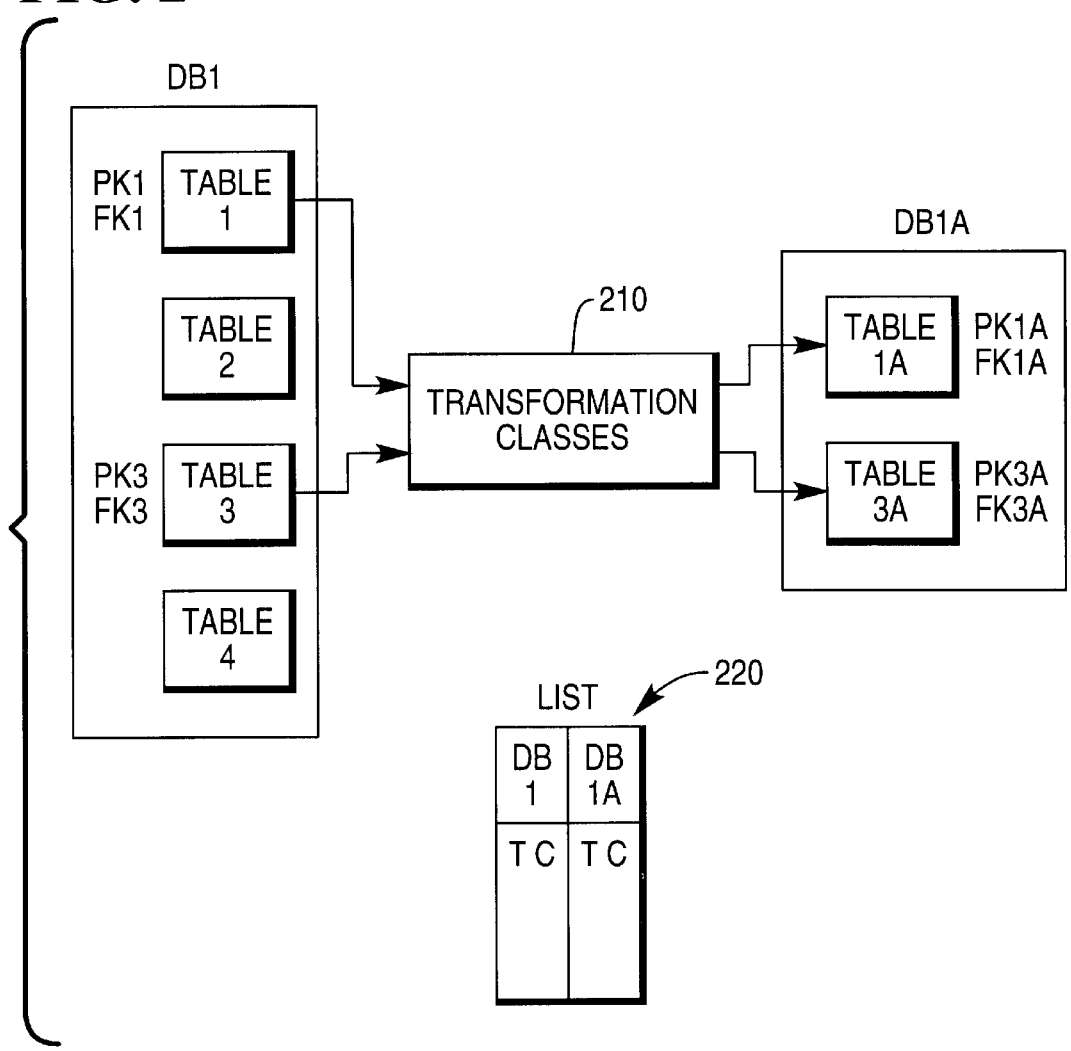
FIG. 2 is a diagram of a transformation according to the present invention.

In FIG. 2, a schematic illustration depicts how the present invention functions. In FIG. 2, there is a database 1 (DB1) having tables 1, 2, 3 and 4. For illustrative purposes, tables 1 and 3 each have a primary key and a foreign key. DB1 uses a first physical data model which describes the data contained in DB1. DB1 has a first data structure defined by the first physical data model. DB1 represents the existing or first customer database. A new database DB1A includes a portion of the tables in DB1. DB1A uses a second physical data model which describes the data contained in DB1A. DB1A has a second data structure defined by the second physical data model. However, new applications may require some of the data in the tables in DB1 to be transformed to a different format to work with the new application. Thus, there is a set of classes 210 for transformation which characterize a set of structural and labeling differences between DB1 and DB1A. Examples of these are:

Simple name changes (Table 1/column 1 to Table 2/column 2)

Name changes and data type changes (e.g., INT to VARCHAR)

Movement from table with one index technique to one with a different index technique (e.g., going from a denormalized to a fully normalized PDM).

This set of classes would be created for all situations encountered where the new applications offered (or bought by the customer) require data fields to be available. This list of data fields can be augmented and the application should be fully scalable. These classes must specify everything which must be done to accomplish a proper transfer, including creating new foreign keys.

Thus, as depicted in FIG. 2, there is an object 210 for transformation classes which accesses a list 220. The list includes a matching list of tables and tables and columns between DB1 and DB1A and the necessary transformation between DB1 and DB1A.

In operation, in a working example, an existing application would access the data stored in tables 1–4 in DB1. However, a new application might require data in a different format. Referring to FIG. 2, an application might require data in the format stored in tables 2 and 4 of DB1. However, the data stored in tables 1 and 3, in this example, is in a format that is not compatible with the new application. Thus, only a portion of DB1 needs to be transformed. Advantageously, this requires less processing time and less storage space than having to transform the entire DB I into a separate data structure.

Figure 3A:
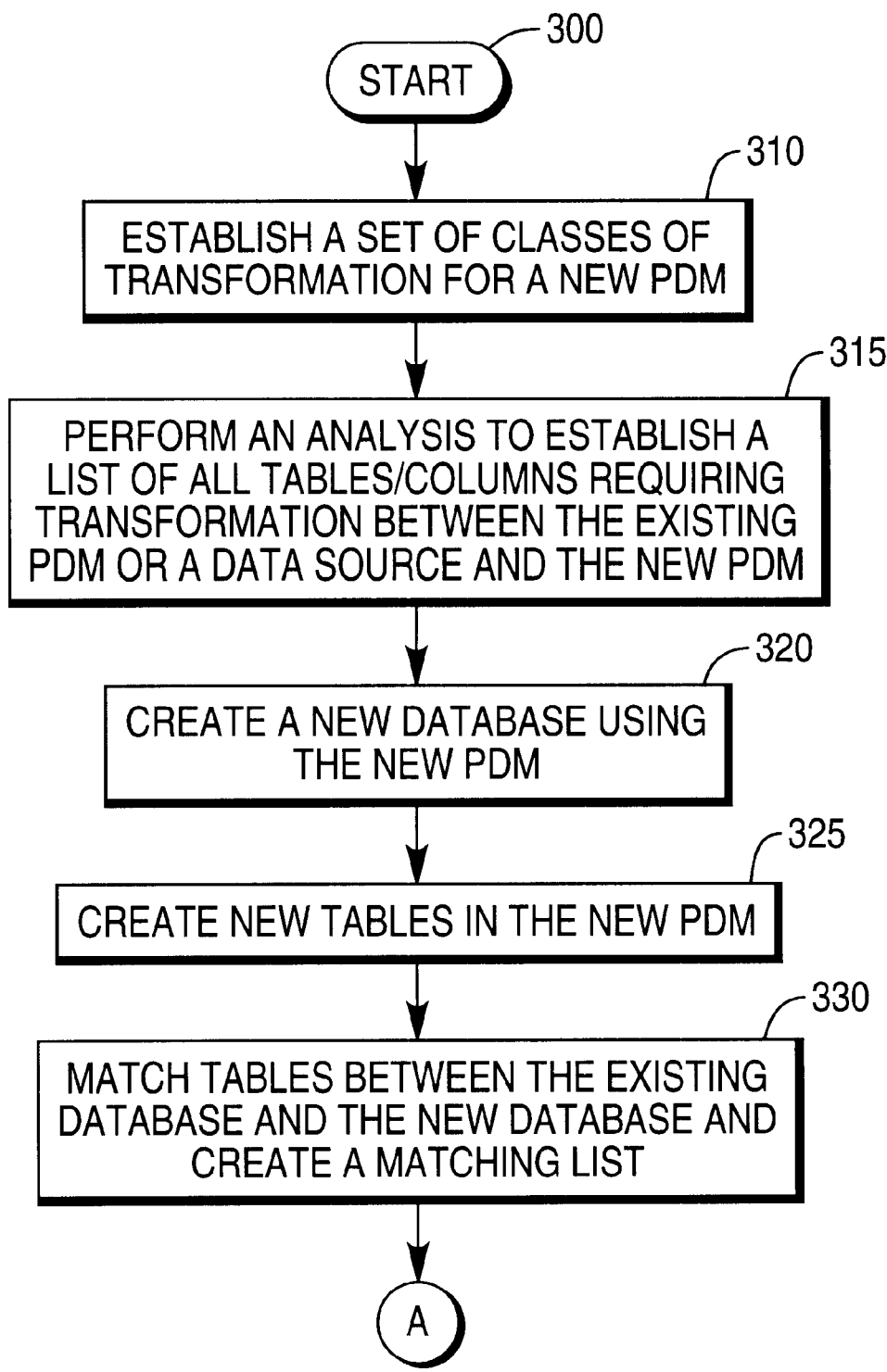
FIGS. 3A and 3B are flow diagrams illustrating a method according to the present invention.
Figure 3B:
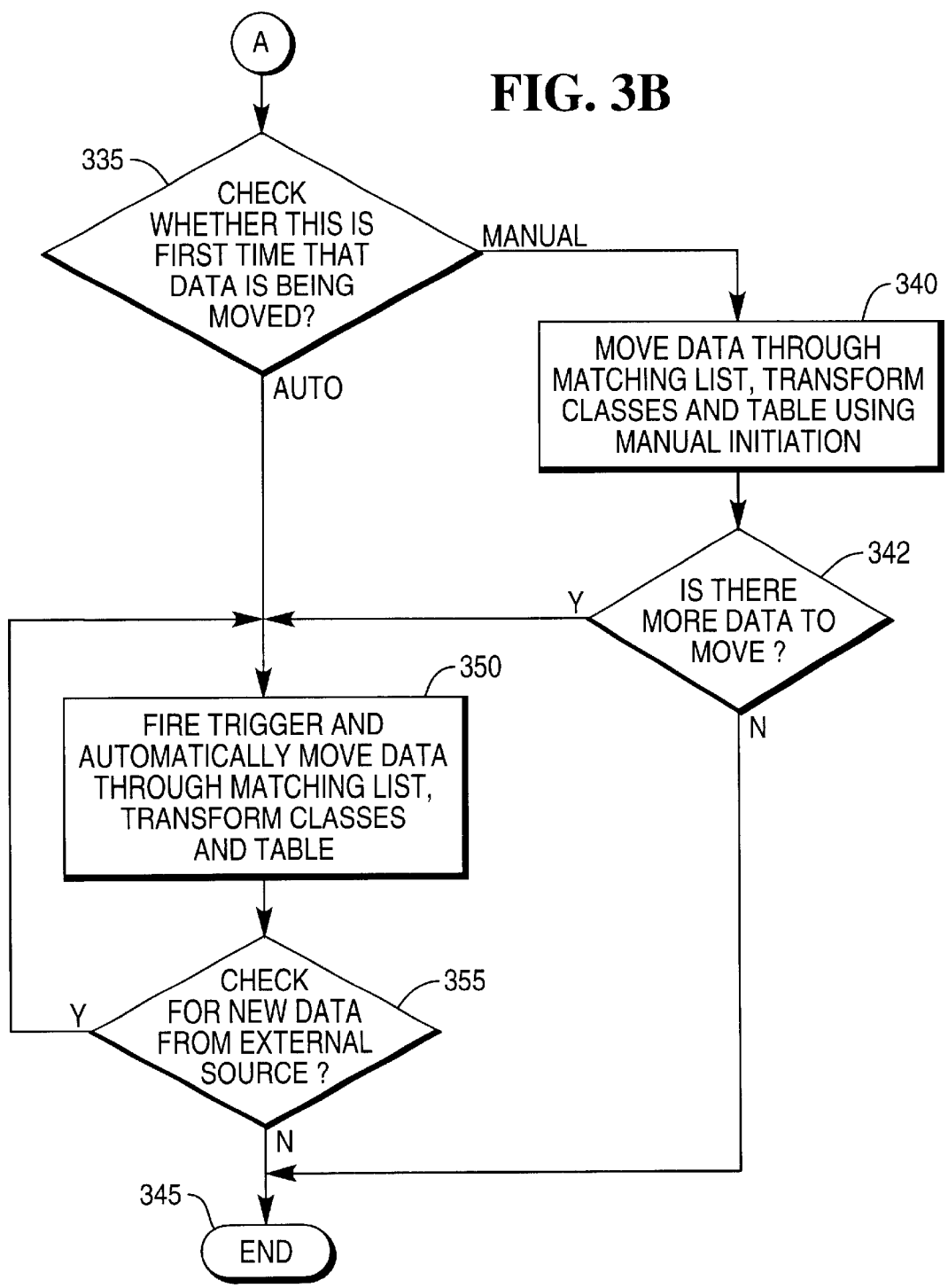

Refer now to FIGS. 3A and 3B where a flow diagram depicting the steps used in the present invention is illustrated. At step 300, the process is started. At step 310, a set of classes is established for transforming data from the format stored in DB1 to the format stored in DB1A. At step 315, an analysis is performed to establish a list (list 220 in FIG. 2) of all tables/columns requiring transformation between the existing PDM (DB1) or a different data source to the tables/columns in a new PDM (DB1A). At step 320, a new database is created using the new PDM. This new database is a combination of some tables in DB1 and other tables in DB1A. At step 325, the new tables are created in the new PDM. At step 330, the tables are matched between the existing data base (DB1) and the new database (DB1A) and a matching list is created (list 220). At step 335, it is decided whether to manually or automatically move data between DB1 and DB1A by checking whether this is the first time that data is being moved. Data is moved manually the first time and then automatically after the first time Alternatively, data can also be moved from an external data source rather than through DB1. If it is determined to move the data manually, that is by initiating data movement using a keystroke or some other means, then at step 340, data is moved through a matching list , transform classes and table using the manual execution. At step 342 it is determined whether there is more data to move. If there is no more data then at step 345, the process is ended. If there is more data to move then the process proceeds to step 350 described below.

If data is to be moved automatically (e.g., periodically or using some time schedule), from step 335, at step 350, the trigger is fired and data is automatically moved through the matching list, transform classes and table to populate DB1A, for example tables 1A and 3A. At step 355, DB1 and/or the external data source is checked for new data. If either of the sources have new data, then the process loops back to step 350. If no new data is detected, then the process is ended at step 345.

It should not be apparent that a method and apparatus have been described in which only a portion of an existing database can be transformed for access by a new application requiring data in a transformed format. Advantageously, the method and apparatus of the present invention requires less storage space and less processing time to transform data and allows reuse of the existing database and data structure.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of using a first database structure and a first application program by transforming a portion of data in the first database structure into a second database structure in a second database for use by a second application program, the method comprising:

establishing a set of classes for the second database structure;

creating a list which relates the set of classes between the first database structure and the second database structure; and moving and transforming a selected portion of the data from the first database structure to the second database structure such that the second application program can use the remaining untransformed data in the first database structure and the transformed data in the second database structure.

2. The method of claim 1, wherein each of the classes in the set of classes relate a table/column in the second database structure to a table/column in the first database structure.

3. The method of claim 2, comprising triggering ad moving step.

4. The method of claim 3, wherein the trigger is automatic.

5. The method of claim 3, wherein the trigger is manual.

6. The method of claim 1, comprising creating new foreign keys.

7. The method of claim 6, wherein each of the classes establishes the new foreign keys.

8. The method of claim 1, comprising running the second application program and accessing data in the first and second data structures.

9. The method of claim 1, comprising running the second application program and using the list, access a portion of the tables in the first database suture and all the tables in the second database structure.

10. A method of using a first database structure and a first application program by transforming a portion of data in the first database structure into a second database structure in a second database for use by a second application program, the method comprising:

establishing a set of classes for the second database structure;

creating a list which relates the set of classes between the first database structure and the second database structure, wherein each of the classes in the set of classes relate a table/column in the second database structure to a table/column in the first database structure; and moving and transforming data from a data source to the second database structure such that the second application program can use the data in the first database structure and the data in the second database structure.

11. The method of claim 10, comprising triggering said moving step.

12. The method of claim 11, wherein the trigger is automatic.

13. The method of claim 12, wherein the trigger is manual.

14. The method of claim 13, comprising creating new foreign keys.

15. The method of claim 14, wherein each of the classes establishes the new foreign keys.

16. The method of claim 15, comprising running the second application program and accessing data in the first and second data structures.

17. The method of claim 16, comprising running the second application program and using the list, access a portion of the tables in the first database structure and all the tables in the second database structure.

18. A computer architecture using a first database structure and a first application program by transforming a portion of data in the first database structure into a second database structure in a second database for use by a second application program, comprising:

establishing means for establishing a set of classes for the second database structure;

creating means for creating a list which relates the set of classes between the first database structure and the second database structure; and moving and transforming means for moving and transforming a selected portion of the data from the first database structure to the second database structure such that the second application program can use the remaining untransformed data in the first database structure and the transformed data in the second database structure.

19. An article using a first database structure and a first application program by transforming a portion of data in the first database structure into a second database structure in a second database for use by a second application program, comprising:

at least one sequence of machine executable instructions;

a medium bearing the executable instructions in machine form, wherein execution of the instructions by one or more processor causes the one or more processors to:

establish a set of classes for the second database structure;

create a list which relates the set of classes between the first database structure and the second database structure; and move and transform a selected portion of the data from the first database structure to the second database structure such that the second application program can use the remaining untransformed data in the first database structure and the transformed data in the second database structure.

20. A computer system, comprising:

a processor; and a memory coupled to said processor, the memory having stored therein sequences of instructions, which, when executed by said processor, causes said processor to perform the steps of:

establishing a set of classes for the second database structure;

creating a list which relates the set of classes between the first database structure and the second database structure; and moving and transforming a selected portion of the data from the first database structure to the second database structure such that the second application program can use the remaining untransformed data in the first database structure and the transformed data in the second database structure.

* * * * *

UNITED STATES PATENT AND TRADEMARK OFFICE
CERTIFICATE OF CORRECTION

PATENT NO. : 6,473,765 B1
DATED : October 29, 2002
INVENTOR(S) : Fink, R.

It is certified that error appears in the above-identified patent and that said Letters Patent is hereby corrected as shown below:

Column 8,
Line 16, after "triggering" delete "ad" and insert -- said --
Line 30, delete "suture" and insert -- structure --

Signed and Sealed this

Twenty-first Day of December, 2004

JON W. DUDAS
*Director of the United States Patent and Trademark Office*